(12) United States Patent
Wildman

(10) Patent No.: US 6,168,411 B1
(45) Date of Patent: Jan. 2, 2001

(54) POLYMER FILTRATION METHOD AND APPARATUS

(75) Inventor: Paul D. Wildman, Saugus, MA (US)

(73) Assignee: Dynisco Extrusion, Inc., Hickory, NC (US)

( * ) Notice: Under 35 U.S.C. 154(b), the term of this patent shall be extended for 0 days.

(21) Appl. No.: 09/271,666

(22) Filed: Mar. 18, 1999

(51) Int. Cl.[7] .................................................. B29C 45/00
(52) U.S. Cl. .......................... 425/197; 264/39; 425/198; 425/199
(58) Field of Search .................................. 425/797, 198, 425/199; 264/39

(56) References Cited

U.S. PATENT DOCUMENTS

| | | |
|---|---|---|
| 1,163,740 | 12/1915 | Cohoe . |
| 1,595,470 | 8/1926 | Johnson . |
| 2,257,067 | 9/1941 | Parsons . |
| 2,374,468 | 4/1945 | Opel . |
| 2,636,218 | 4/1953 | Orsini . |
| 2,653,351 | 9/1953 | Henning . |
| 2,770,836 | 11/1956 | Hankey . |
| 2,864,126 | 12/1958 | Henning . |
| 2,895,167 | 7/1959 | Paggi . |
| 3,335,461 | 8/1967 | Schwartz . |
| 3,495,299 | 2/1970 | Chazal et al. . |
| 3,578,741 | 5/1971 | Blumer . |
| 3,710,988 | 1/1973 | Moslo ................................ 222/404 |
| 4,077,756 | 3/1978 | Meadors ............................ 425/207 |
| 4,112,516 | 9/1978 | Hotz ................................... 366/80 |
| 4,174,198 | 11/1979 | Kinoshita ........................... 425/135 |
| 4,177,234 | 12/1979 | Lowry . |
| 4,191,648 | 3/1980 | Kaplan et al. ..................... 210/186 |
| 4,257,901 | 3/1981 | Rapp .................................. 210/791 |
| 4,332,541 | 6/1982 | Anders ............................... 425/197 |
| 4,358,262 | 11/1982 | Herbert .............................. 425/185 |
| 4,434,053 | 2/1984 | Osuna-Diaz ....................... 210/446 |
| 4,477,242 | 10/1984 | Eichlseder et al. ................ 425/207 |
| 4,486,304 | 12/1984 | Neuman et al. ................... 210/107 |
| 4,511,472 | 4/1985 | Trott .................................. 210/340 |
| 4,512,733 | 4/1985 | Eichlesder et al. ................ 425/207 |
| 4,627,916 | 12/1986 | Dörsam .............................. 210/488 |

(List continued on next page.)

FOREIGN PATENT DOCUMENTS

| | | |
|---|---|---|
| 2524746 A1 | 12/1976 | (DE) . |
| 2541738 C3 | 3/1977 | (DE) . |
| 4426629A1 | 2/1996 | (DE) . |
| 0172925 | 3/1986 | (EP) . |
| 1.272.329 | 8/1961 | (FR) . |
| 1.553.319 | 12/1968 | (FR) . |
| 2324443 | 4/1977 | (FR) . |
| WO 90/03879 | 4/1990 | (WO) . |

*Primary Examiner*—Tim Heitbrink
(74) *Attorney, Agent, or Firm*—Hamilton, Brook, Smith & Reynolds, PC

(57) ABSTRACT

The present invention includes a filtration apparatus for an injection molding machine where the injection molding machine includes a screw housed within a bore for generating molten polymer. A tip member extends axially from the screw. The tip member has radially extending upstream and downstream flanges positioned axially apart from each other. A filter encircles the tip member and is capable of filtering the molten polymer. An annular ring member encircles the tip member and is slidably positioned within the bore between the upstream and downstream flanges. The ring member is capable of sliding between the flanges for directing the molten polymer through the filter or preventing back flow of the molten polymer past the upstream flange. An end stop is positioned relative to the bore and is capable of engaging and preventing movement of the ring member past the end stop while allowing the downstream flange of the tip member to be translated forwardly therepast to simultaneously space the upstream and downstream flanges apart from the ring member. This directs the molten polymer past upstream surfaces of the filter for purging contaminants filtered from the molten polymer.

33 Claims, 13 Drawing Sheets

U.S. PATENT DOCUMENTS

| | | | |
|---|---|---|---|
| 4,661,249 | 4/1987 | Langley | 210/266 |
| 4,714,422 | 12/1987 | Meeker et al. | 425/204 |
| 4,849,113 | 7/1989 | Hills | 210/741 |
| 4,966,539 | 10/1990 | Pena | 425/208 |
| 5,122,286 | 6/1992 | Kreyenborg et al. | |
| 5,141,631 | 8/1992 | Whitman | 210/108 |
| 5,151,025 | 9/1992 | Müller | 425/199 |
| 5,246,660 | 9/1993 | Tsutsumi | 264/328 |
| 5,417,866 | 5/1995 | Trott | 210/791 |
| 5,456,828 | 10/1995 | Tersi et al. | 210/184 |
| 5,462,653 | 10/1995 | Hills | 210/85 |
| 5,507,498 | 4/1996 | Trott | 277/1 |
| 5,510,030 | 4/1996 | Bacher et al. | 210/397 |
| 5,618,423 | 4/1997 | Lin | 210/360.2 |
| 5,783,223 | 7/1998 | Anderson | 425/185 |

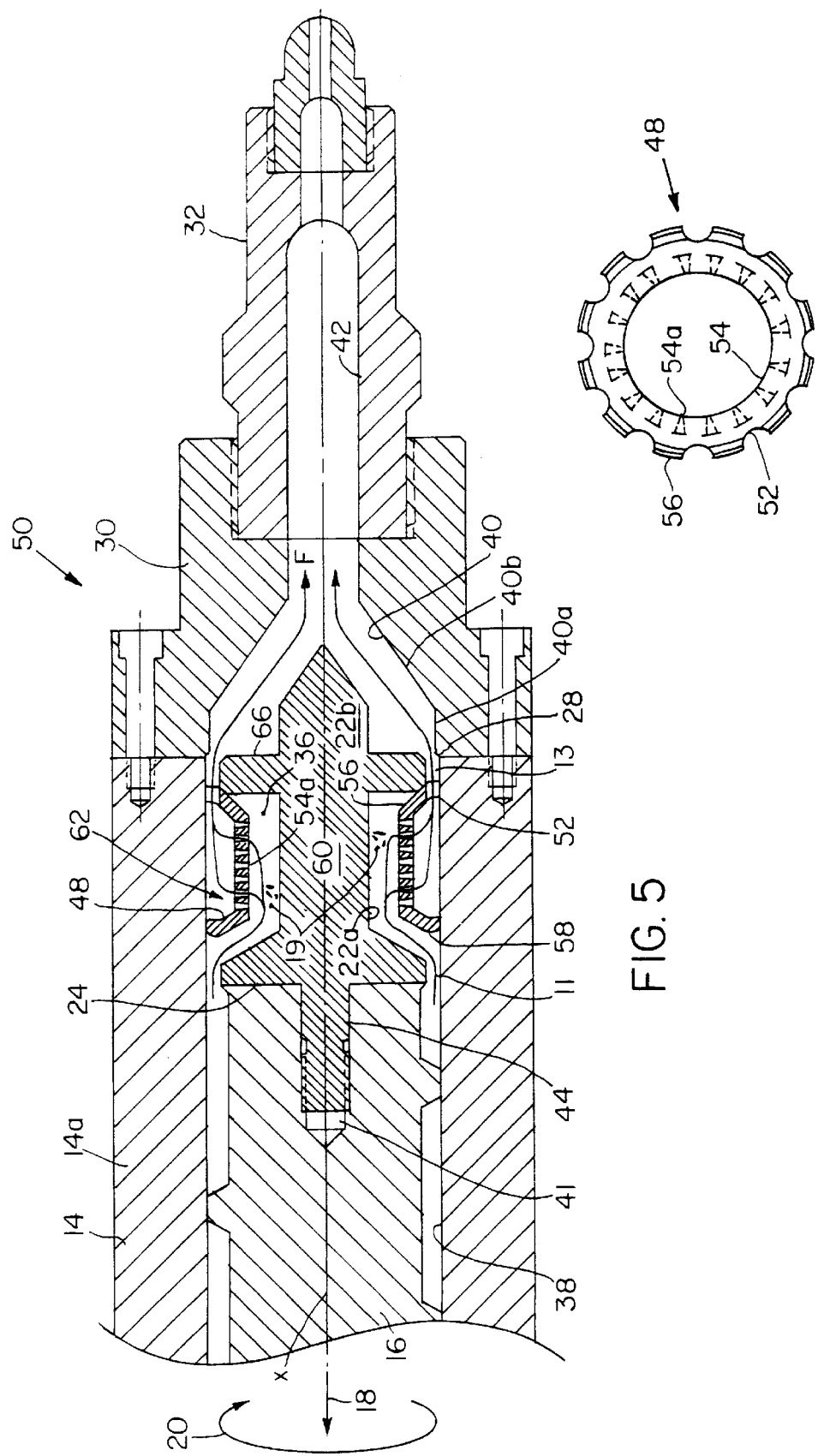

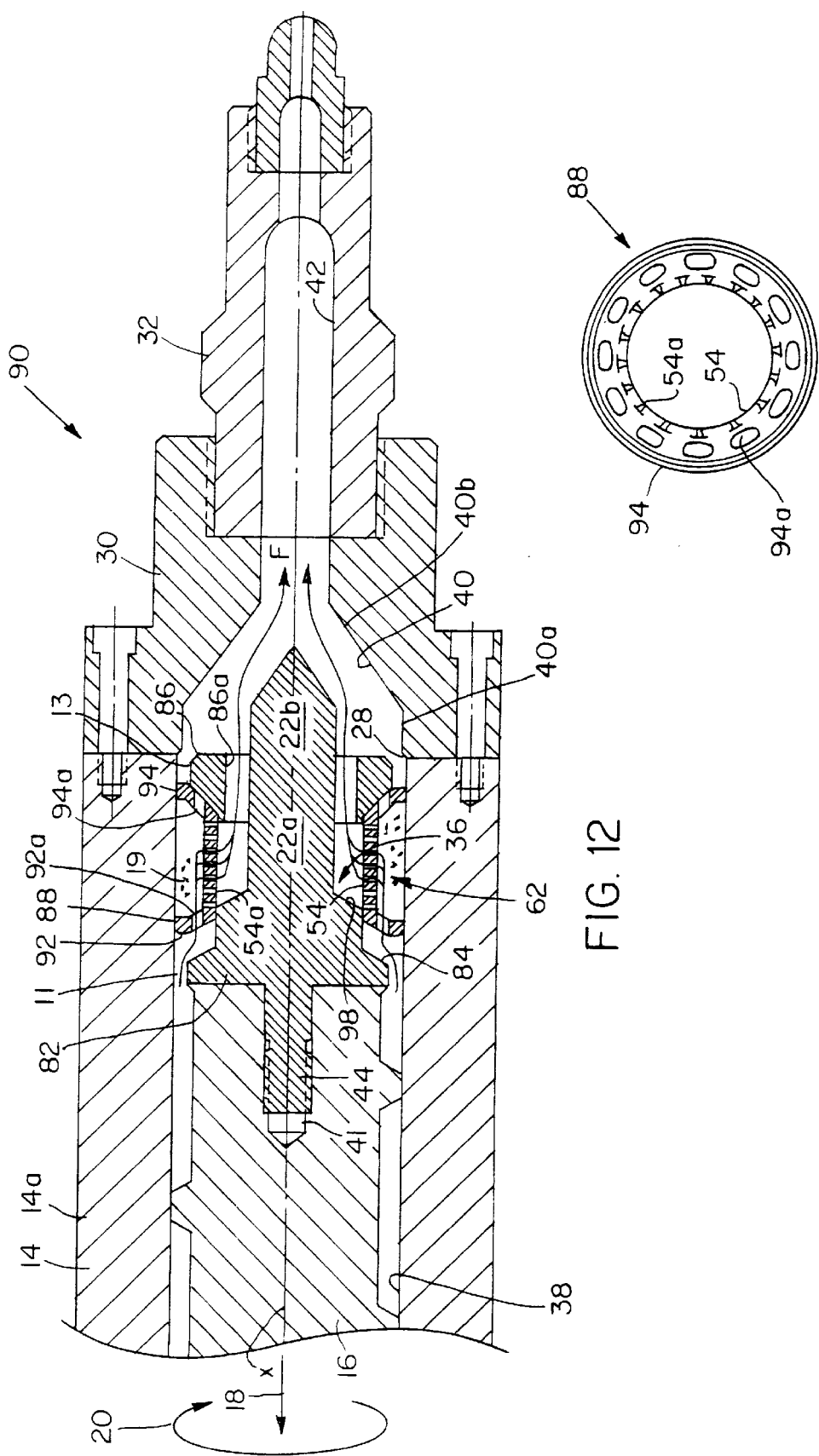

POLYMER FILTRATION METHOD AND APPARATUS

BACKGROUND

Generally, polymer injection molding machines include an elongate barrel with a bore extending therethrough. A powered elongate screw is housed within the bore of the barrel. Rotation of the screw within the bore plasticizes and melts polymer pellets fed into the bore from a hopper. In an injection stroke, forward translation of the screw relative to the bore forces a shot of accumulated molten polymer from the bore for injection into a mold.

In some instances, a filter assembly is positioned at the end of the barrel for filtering contaminants from the molten polymer as the polymer is forced in a shot from the bore by the forward translation of the screw. The filter assembly can include a mechanism which removes contaminated filter elements from the polymer flow path and then repositions clean filter elements back into the flow path. A drawback of such a filter assembly is that filtering the molten polymer during the injection stroke of the screw results in a very high flow rate of polymer through the filter assembly which increases resistance to the injection stroke as well as the time required to perform the injection stroke. In addition, the filter elements usually require handling by the machine operator, which, depending upon the design of the filter assembly, can be unwieldly. Previous attempts to position a purgable filter within the barrel to filter polymer prior to the injection stroke in order to avoid these problems require special channels formed within the barrel for purging contaminants from the filter. Such channels can be difficult to manufacture.

SUMMARY OF THE INVENTION

The present invention includes a filtration apparatus for an injection molding machine where the injection molding machine includes a screw housed within a bore for generating molten polymer. The filtration apparatus filters molten polymer prior to but not during the injection stroke of the screw and does not require any changing of filter elements or special channels in the barrel, thereby avoiding the problems discussed above.

In the preferred filtration apparatus, a tip member extends axially from the screw within the bore. The tip member has radially extending upstream and downstream flanges positioned axially apart from each other. A filter encircles the tip member and is capable of filtering contaminants from the molten polymer. An annular ring member encircles the tip member and is slidably positioned within the bore between the upstream and downstream flanges. The ring member is capable of slidably engaging the downstream flange of the tip member for directing the molten polymer through the filter. The filtered molten polymer accumulates within the bore. The ring member is also capable of slidably engaging the upstream flange for preventing back flow of the molten polymer past the upstream flange when forcing a shot of accumulated molten polymer from the bore with forward translation of the screw. An end stop is positioned relative to the bore and is capable of engaging and preventing movement of the ring member past the end stop while allowing the downstream flange of the tip member to be translated forwardly therepast to simultaneously space the upstream and downstream flanges apart from the ring member. This directs the molten polymer past the upstream surfaces of the filter rather than through the filter for purging contaminants filtered from the molten polymer.

In preferred embodiments, the tip member is mounted to the screw and the end stop is an annular surface of an end cap which forms a shoulder when positioned against the bore. In some of the preferred embodiments, the filter includes a series of holes extending within the tip member. The holes in one embodiment extend radially inwardly into the tip member to a central bore in an area between the flanges. In another embodiment, the holes extend axially through the downstream flange. In yet another embodiment, the filter includes a filter screen.

In other preferred embodiments, the ring member includes an inner radial wall and opposing upstream and downstream walls which substantially enclose an annular region. A series of holes extend through the radial wall of the ring member to form the filter. The downstream wall of the ring member includes axial openings for allowing the molten polymer to pass from the annular region through the downstream wall.

The present invention also provides an injection molding machine including a bore and a screw positioned within the bore for plasticizing polymer into polymer melt. The screw is translatable between forward and rearward positions to allow polymer melt to flow and accumulate forward of the screw and to allow injection of the melt with a forward stroke of the screw. A filter is included for filtering polymer melt as the melt flows forward of the screw. A normally closed bypass path for directing polymer melt past the filter is opened during a contaminant purge by forward flow of polymer melt while the screw is in a forward position in which polymer melt is delivered by the screw past the filter and out of the bore.

In preferred embodiments, the screw includes a screw tip having a forward flange and a rearward flange. An axially translatable ring is positioned about the screw tip for controlling the bypass path. The ring is moved forward against the forward flange by forward flow of polymer melt during normal operation to close the bypass path. A restraint formed by a shoulder in the bore restrains the ring from abutting the forward flange to open the bypass path when the screw is moved in the forward position while the screw causes polymer melt to flow forward. The ring abuts the rearward flange to prevent backflow along the screw and through the filter during an injection stroke.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5 is a side sectional view of the distal end of an injection molding machine including another preferred polymer filtration apparatus.

FIG. 6 is a front view of the ring member of FIG. 5.

FIG. 12 is a side sectional view of the distal end of an injection molding machine including still another preferred polymer filtration apparatus.

FIG. 13 is a front view of the ring member of FIG. 12.

DETAILED DESCRIPTION OF THE INVENTION

Figure 1:
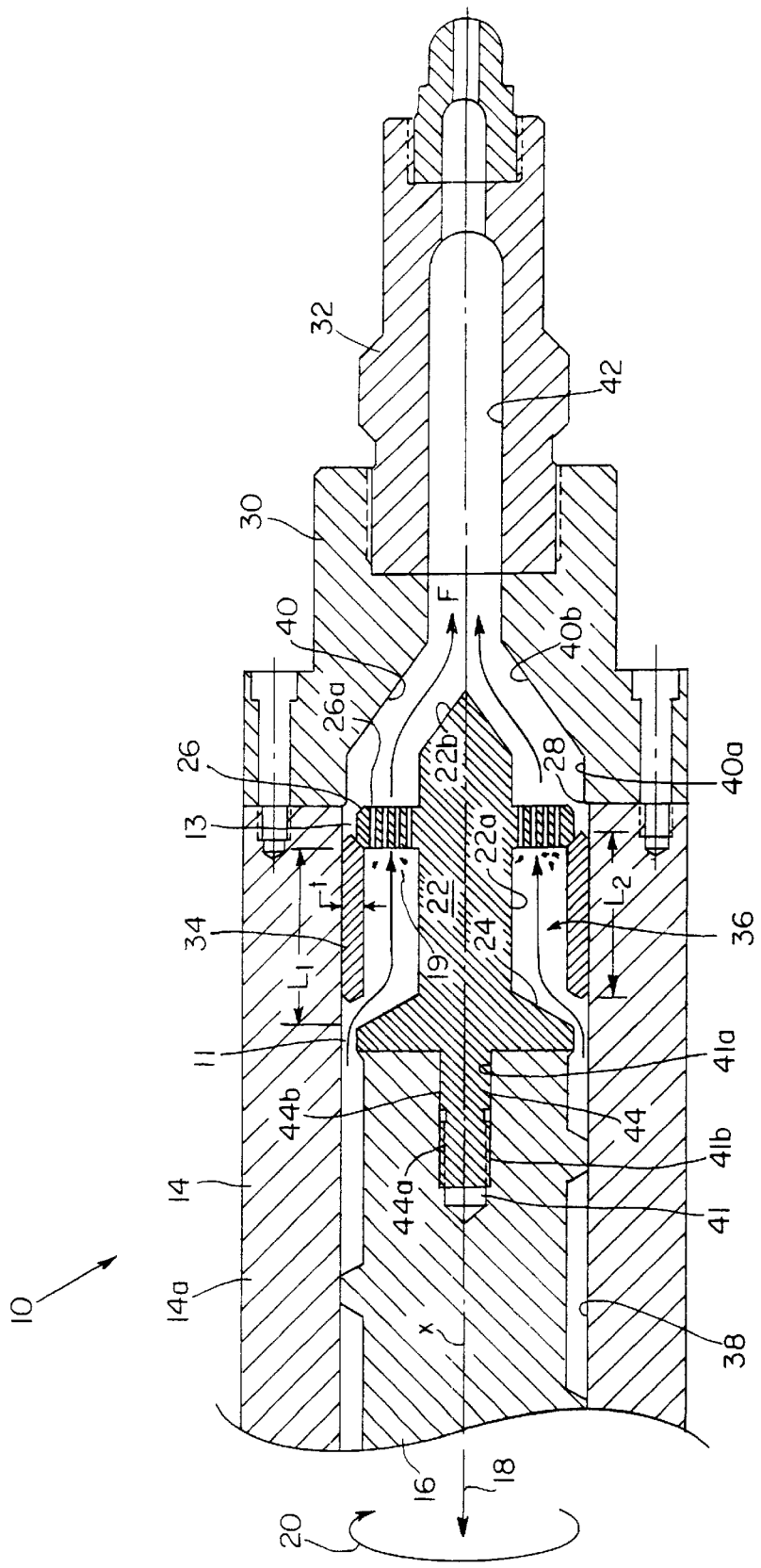
FIG. 1 is a side sectional view of the distal end of an injection molding machine including the present polymer invention filtration apparatus.

Referring to FIGS. 1, 2, 3 and 4, polymer filtration apparatus 10 is incorporated within the distal end of an injection molding machine 14. Injection molding machine 14 includes a powered elongate screw 16 housed within a constant diameter bore 38 extending through a barrel 14a. Screw 16 is rotatable in the direction of arrow 20 for plasticizing and melting polymer pellets fed into bore 38. Screw 16 is also translatable in the directions of arrows 18 and 46 (FIG. 3) for accumulating molten polymer within bore 38 and for forcing a single shot of molten polymer from bore 38 in an injection stroke into a mold (not shown). An end cap 30 is mounted to the end of barrel 14a with screws and has a narrowing bore 40 in communication with bore 38. Bore 40 has a constant diameter portion 40a at the upstream end which extends into a tapering portion 40b. The constant diameter portion 40a at the upstream end has a diameter that is slightly less than the diameter of bore 38, thereby forming an annular shoulder 28 between bores 38 and 40. A nozzle 32 is secured to the downstream end of end cap 30. Nozzle 32 has a nozzle opening 42 in communication with bore 40. Nozzle 32 engages with the mold for directing polymer into the mold.

A tip member 22 is secured to the distal end of screw 16. Tip member 22 has a mounting shaft 44 which engages a hole 41 at the distal end of screw 16 for securing tip member 22 to the distal end of screw 16. Mounting shaft 44 has a proximal smooth diameter portion 44b and a distal threaded portion 44a. The smooth diameter portion 44b of shaft 44 mates with a smooth bore portion 41a of hole 41 for locating tip member 22 concentrically relative to axis X of screw 16 while the threaded portion 44a of shaft 44 engages threaded hole portion 41b of hole 41 for securing tip member 22 thereon. A circular upstream flange 24 extends from mounting shaft 44 and abuts the distal end of screw 16 when tip member 22 is secured thereon. A circular downstream flange 26 is axially spaced apart from upstream flange 24 by an intermediate shaft portion 22a extending therebetween. The opposing faces of flanges 24 and 26 are separated by a distance $L_1$. The diameters of flanges 24 and 26 are smaller than bore 38 to form respective annular gaps or passages 11 and 13 therebetween. In addition, the diameter of downstream flange 26 is less than the diameter of constant diameter portion 40a of bore 40 for allowing flange 26 to extend therein, as discussed later. The diameters of flanges 24 and 26 are greater than the diameter of intermediate shaft portion 22a so that the flanges 24/26, intermediate shaft portion 22a and ring member 34 (discussed below), define an annular region 36 therebetween. Downstream flange 26 has a series of filter holes 26a extending axially therethrough parallel to the axis X of screw 16. The series of filter holes 26a forms a filter for filtering contaminants 19 from molten polymer forced downstream by the rotation of screw 16. Tip 22b of tip member 22 extends from downstream flange 26 and tapers to a point to promote the smooth flow of polymer thereover. Tip member 22 is preferably formed in two pieces with intermediate shaft portion 22a being secured to upstream flange 24 by threaded portions, but alternatively, can be one piece.

An annular ring member 34 is slidably positioned within bore 38 and is positioned between the upstream 24 and downstream 26 flanges of tip member 22. Ring member 34 has a sliding fit with the inner surfaces of bore 38 and has an axial length $L_2$ that is slightly less than the axial distance $L_1$ between flanges 24 and 26. The annular thickness t of ring member 34 is greater that the annular width of annular gaps 11/13 between flanges 24/26 and bore 38. This allows ring member 34 to act as a valve by sliding within bore 38 between flanges 24 and 26 to blocking either annular gap 11 or 13. The upstream and downstream surfaces of ring member 34, as well as the mating surfaces of flanges 24/26 are shaped to form sealing surfaces therebetween when engaged.

Tip member 22 and ring member 34 are preferably made of tool steel but alternatively, can be made of other suitable hardened steels. In addition, although the downstream surfaces of flange 24 and tip 22b are preferably angled to promote the smooth flow of polymer thereover, alternatively, the downstream surfaces of flange 24 and tip 22b can be perpendicular to axis X. Furthermore, filter holes 26a are preferably about 500 microns in diameter but can vary between 200 microns and 5,000 microns depending upon the application at hand.

Figure 2:
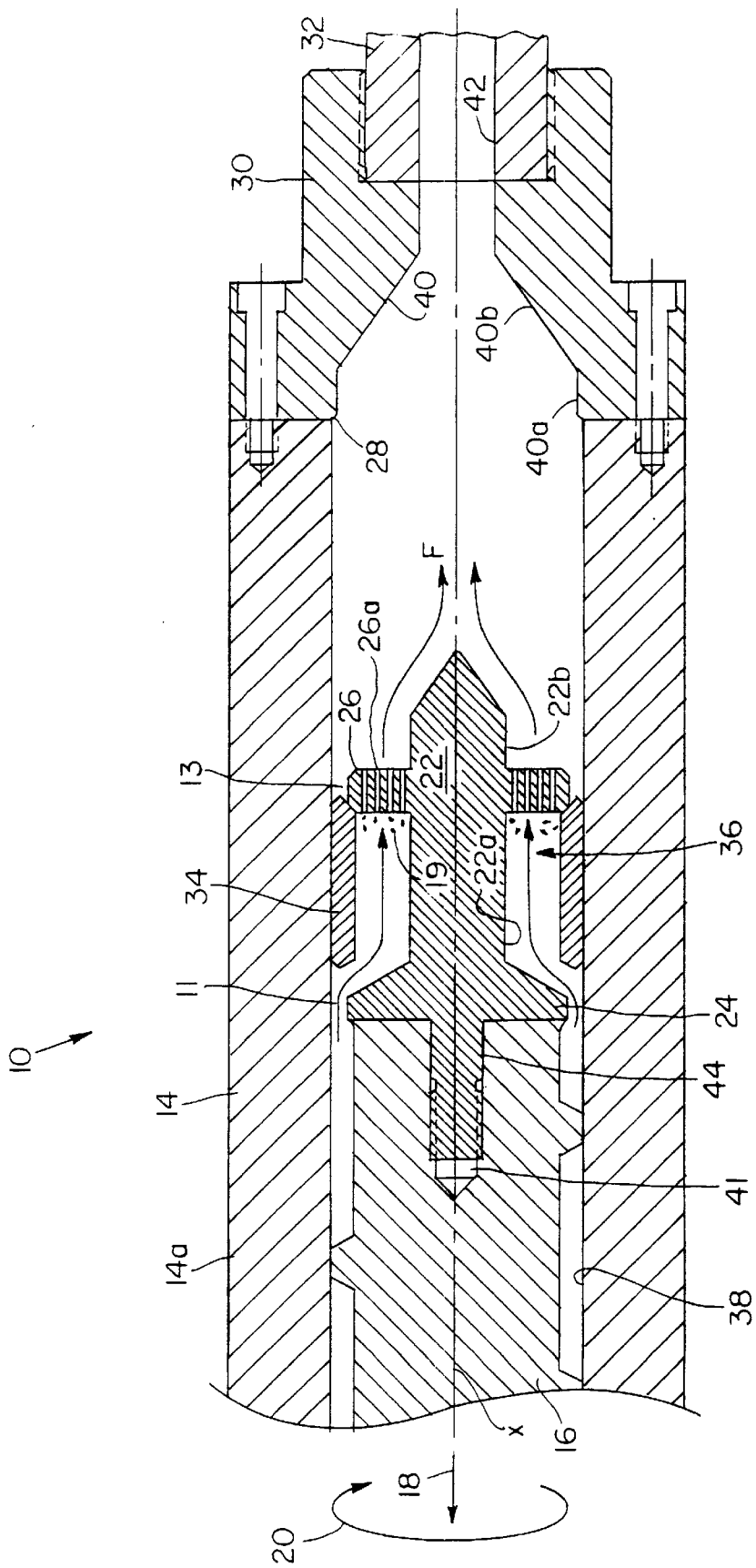
FIG. 2 is a side sectional view of the injection molding machine and filtration apparatus of FIG. 1 in which the screw is translated backward to accumulate molten polymer in front of the screw.

Referring to FIGS. 1 and 2, a description of the operation of filtration apparatus 10 now follows. Screw 16 of injection molding machine 14 is rotated in the direction of arrow 20 to plasticize and melt polymer pellets fed into barrel 14a. As the polymer melt is delivered to the end of the bore, screw 16 is translated backwardly in the direction of arrow 18 from the position of FIG. 1 to that of FIG. 2 to allow molten polymer to accumulate downstream from screw 16.

The rotation of screw 16 forces molten polymer against the upstream surfaces of ring member 34 which in combination with backward movement of screw 16, moves ring member 34 against downstream flange 26, thereby blocking and sealing the annular gap 13 around flange 26. As a result, annular gap 13 is isolated from annular region 36 so that molten polymer forced by the rotation of screw 16 is directed through the filter holes 26a of downstream flange 26 to remove contaminants 19 from the polymer. The contaminants 19 accumulate within the annular region 36 behind downstream flange 26. The flow path of the molten polymer generated by screw 16, as indicated by arrows F, axially passes upstream flange 24 through annular gap 11 and flows radially inwardly into the annular region 36. Once in annular region 36, the molten polymer flows axially towards and through the filter holes 26a of downstream flange 26, and then over tip 22b. The filtered molten polymer accumulates downstream from screw 16 and tip member 22 within bore 38, passage 40 and nozzle opening 42.

Figure 3:
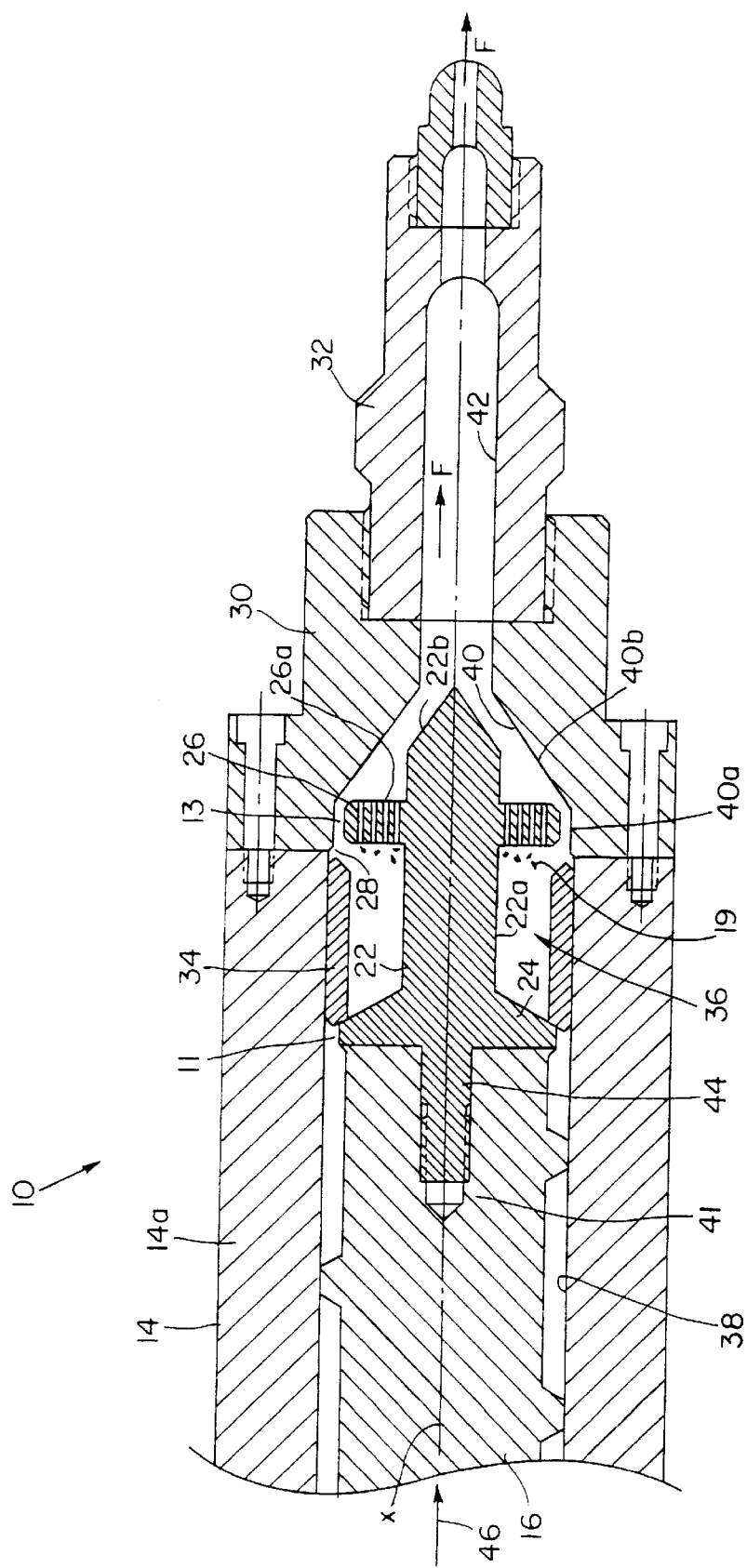
FIG. 3 is a side sectional view of the injection molding machine and the filtration apparatus of FIG. 1 in which the screw is translated forward in a polymer injection stroke.

Referring to FIG. 3, when the desired amount of filtered molten polymer is accumulated downstream or in front of screw 16, the rotation of screw 16 is stopped and screw 16 is translated forward in an injection stroke in the direction of arrow 46. This forces a shot of molten polymer through bore 38, through bore 40, through nozzle opening 42, and into the awaiting mold, as indicated by arrows F. FIG. 3 depicts screw 16 in the forward position at the end of the injection stroke.

When screw 16 is translated forward, the combination of the forward movement of screw 16 and the back pressure of the molten polymer downstream from ring member 34, forces ring member 34 to slide up against upstream flange 24, thereby blocking and sealing the annular gap 11 surrounding flange 24. This prevents the backflow of polymer past upstream flange 24 during the injection stroke. Typically, the contaminants 19 remain in annular region 36 behind downstream flange 26 during the injection stroke. After the injection stroke is finished, the screw 16 is again rotated in the direction of arrow 20 and translated backwardly in the direction of arrow 18, as shown in FIG. 1, in order to accumulate more filtered molten polymer for another injection stroke.

Figure 4:
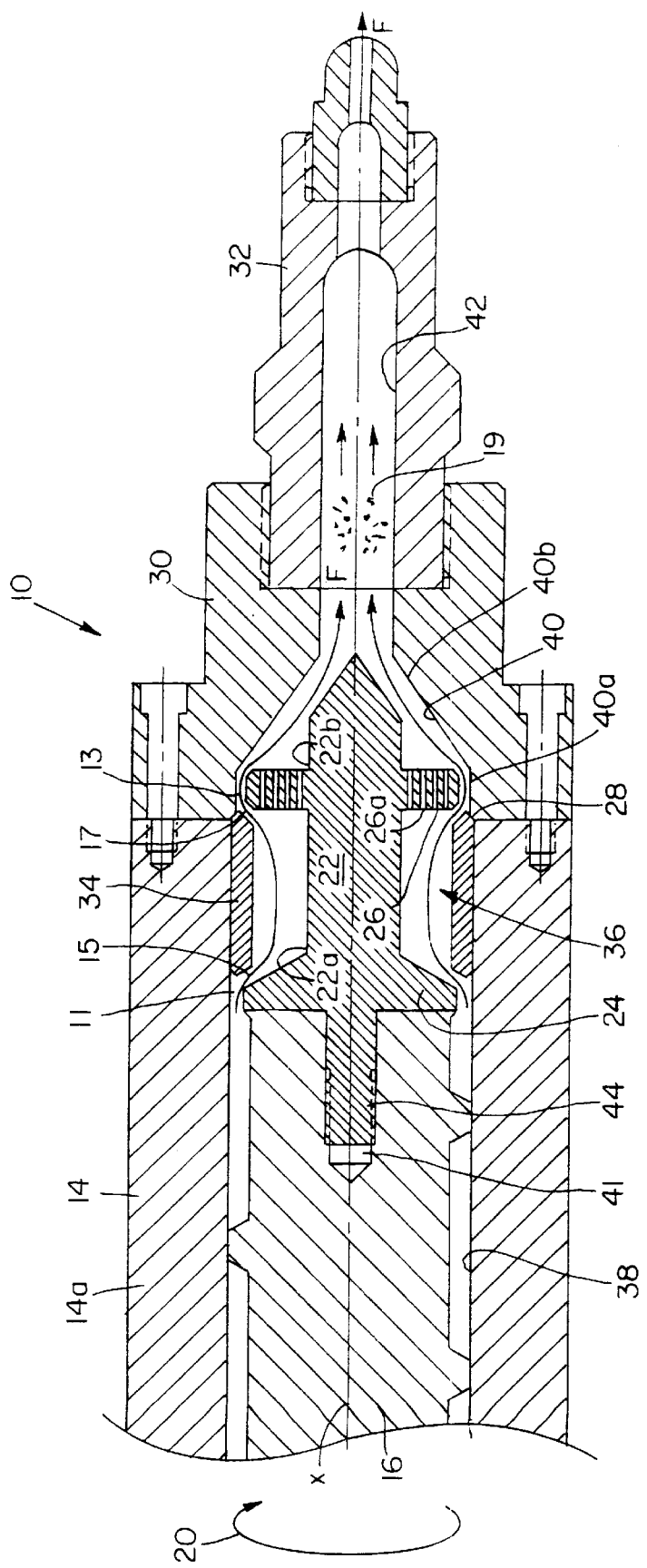
FIG. 4 is a side sectional view of the injection molding machine and the filtration apparatus of FIG. 1 in which the screw is positioned forward for purging contaminants from the filter.

Referring to FIG. 4, during normal use, contaminants 19 gradually build up within annular region 36 behind downstream flange 26. Typically, the contaminants 19 require purging only once or twice a day. Purging of the contaminants 19 is accomplished by translating screw 16 forwardly as in an injection stroke and additionally rotating screw 16 in the direction of arrow 20. Downstream flange 26 is positioned slightly past shoulder 28 within the constant diameter portion 40a of end cap 30. The flow of molten polymer forces ring member 34 forward against shoulder 28. Shoulder 28 acts as an end stop which prevents further travel of ring member 34 downstream of shoulder 28. Preferably, downstream flange 26 is positioned past shoulder 28 a distance that is about $(L_1-L_2)/2$, where $L_1$ is the distance between flanges 24/26 and $L_2$ is the axial length of ring member 34. This positions ring member 34 midway between flanges 24 and 26. As a result, there is a gap or passage 15 between the upstream flange 24 and ring member 34, and a gap or passage 17 between the downstream flange 26 and ring member 34. Consequently, molten polymer can flow around tip member 22 to flush out or purge contaminants 19 captured within annular region 36 behind downstream flange 26 for discharge through nozzle 32. The flow path of the molten polymer as indicated by arrows F, axially passes upstream flange 24 through gap 11 and flows radially inwardly into annular region 36 through gap 15. After flowing axially through annular region 36, the polymer flows radially outwardly through gap 17 and axially passes flange 26 through gap 13. The polymer then flows over tip 22b, through bore 40, and out through nozzle opening 42 of nozzle 32. Once the contaminants 19 have been purged, injection molding machine 14 is again ready for operation as depicted in FIG. 1.

The operation of filtration apparatus 10 does not require any handling or changing of filter elements by the operator and the injection molding machine 14 can be programmed to automatically purge the contaminants 19 on a timed basis or when the pressure within barrel 14a exceeds a predetermined level. In addition, since the molten polymer is filtered while the molten polymer is accumulating within bore 38, instead of during the injection stroke of screw 16, the screw 16 encounters less resistance during the injection stroke and is able to move forwardly more quickly. This allows quicker injection of the molten polymer into the mold which increases the speed and capacity of the injection molding machine 14. The present invention polymer filtration apparatus 10 does not require any special passages, recesses or channels formed in the barrel 14a or the bore 38. As a result, polymer filtration apparatus 10 can be incorporated into most existing injection molding machines by the installation of a tip member 22, ring member 34, end cap 30 and nozzle 32.

Referring to FIGS. 5, 6, 7 and 8, filtration apparatus 50 differs from filtration apparatus 10 in that tip member 60 has a solid downstream flange 66. In addition, ring member 48 has a radial wall 54 with opposing upstream 58 and downstream 56 walls connected to opposite ends thereof. Radial wall 54 extends concentrically around axis X while the upstream 58 and downstream 56 walls extend radially outwardly from radial wall 54. Radial wall 54 has a series of filter holes 54a extending radially therethrough. Downstream wall 56 includes a series of arched passages 52 extending axially therethrough (FIG. 6) along the outer radial edge of downstream wall 56. Walls 58, 56 and 54 define the ends and inner perimeter of an annular region 62. The outer perimeter of annular region 62 is defined by bore 38.

In the operation of filtration apparatus 50 (FIG. 5), when screw 16 is rotated in the direction of arrow 20 to plasticize polymer pellets within bore 38 and translated backwardly in the direction of arrow 18 to accumulate molten polymer within bore 38, the downstream wall 56 of ring member 48 is forced against downstream flange 66. This isolates annular region 36 from annular gap 13 to direct molten polymer through the filter holes 54a in ring member 48. The filter holes 54a remove contaminants 19 from the polymer. The contaminants 19 accumulate within annular region 36 behind downstream flange 66 and radial wall 54. The flow path of the molten polymer as indicated by arrows F, axially passes upstream flange 24 through annular gap 11 and flows radially inwardly into annular region 36. Once in annular region 36, the molten polymer flows radially outwardly into the annular region of ring member 48 through the filter holes 54a in radial wall 54. The polymer then flows axially towards and through the openings 52 in downstream wall 56, past downstream flange 66 through annular gap 13, and over tip 22b.

Figure 7:
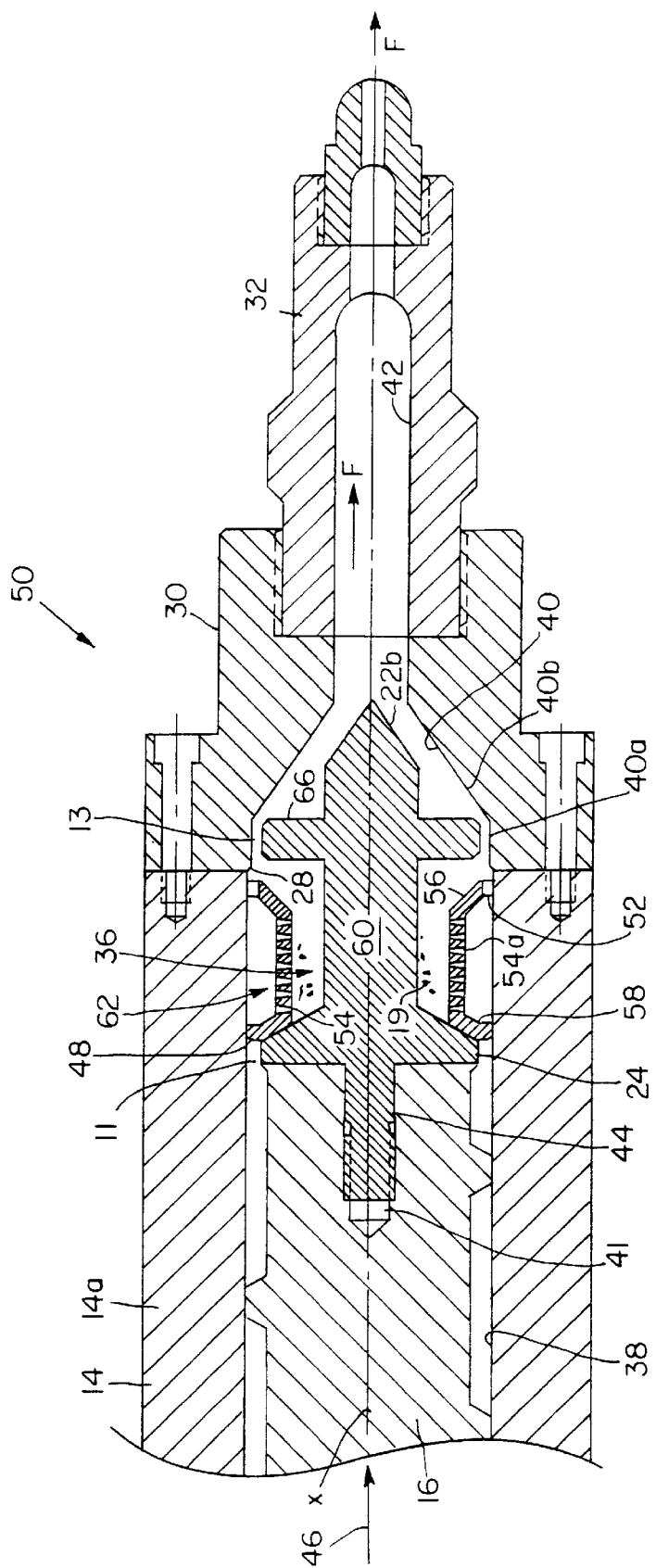
FIG. 7 is a side sectional view of the injection molding machine and filtration apparatus of FIG. 5 with the screw translated forward in a polymer injection stroke.

Referring to FIG. 7, when screw 16 is translated in the forward injection stroke for injecting a shot of molten polymer from bore 38 into a mold, as indicated by arrows F, the upstream wall 58 of ring member 48 is forced against upstream flange 24, thereby sealing annular gap 11 and preventing the backflow of molten polymer past flange 24.

Figure 8:
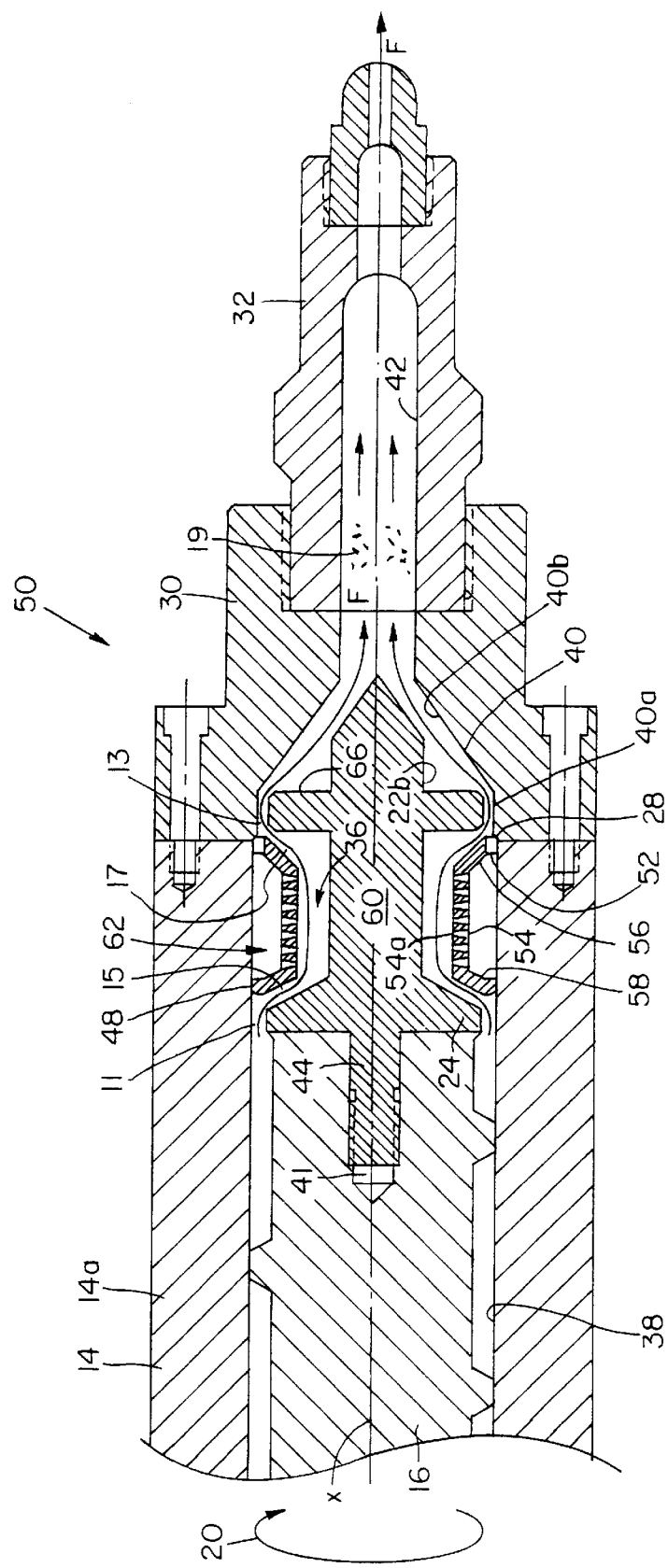
FIG. 8 is a side sectional view of the injection molding machine and filtration apparatus of FIG. 5 in which the screw is positioned forward for purging contaminants from the filter.

Referring to FIG. 8, when the purging of contaminants 19 from annular region 36 is necessary, screw 16 is translated forward to position downstream flange 66 within constant diameter portion 40a and past shoulder 28 in a similar manner as shown in FIG. 4. This positions ring member 48 midway between flanges 24 and 66. As a result, molten polymer flows around tip member 60 to purge contaminants 19 captured within annular region 36 behind radial wall 54 and downstream flange 66 for discharge through nozzle 32.

The flow path of the molten polymer as indicated by arrows F, axially passes upstream flange 24 through gap 11 and flows radially inwardly into annular region 36 through gap 15. The molten polymer flows axially through annular region 36 and then radially outwardly through gap 17. The polymer then flows axially past downstream flange 66 through gap 13, over tip 22b, through bore 40, and out through nozzle opening 42 of nozzle 32.

Figure 9:
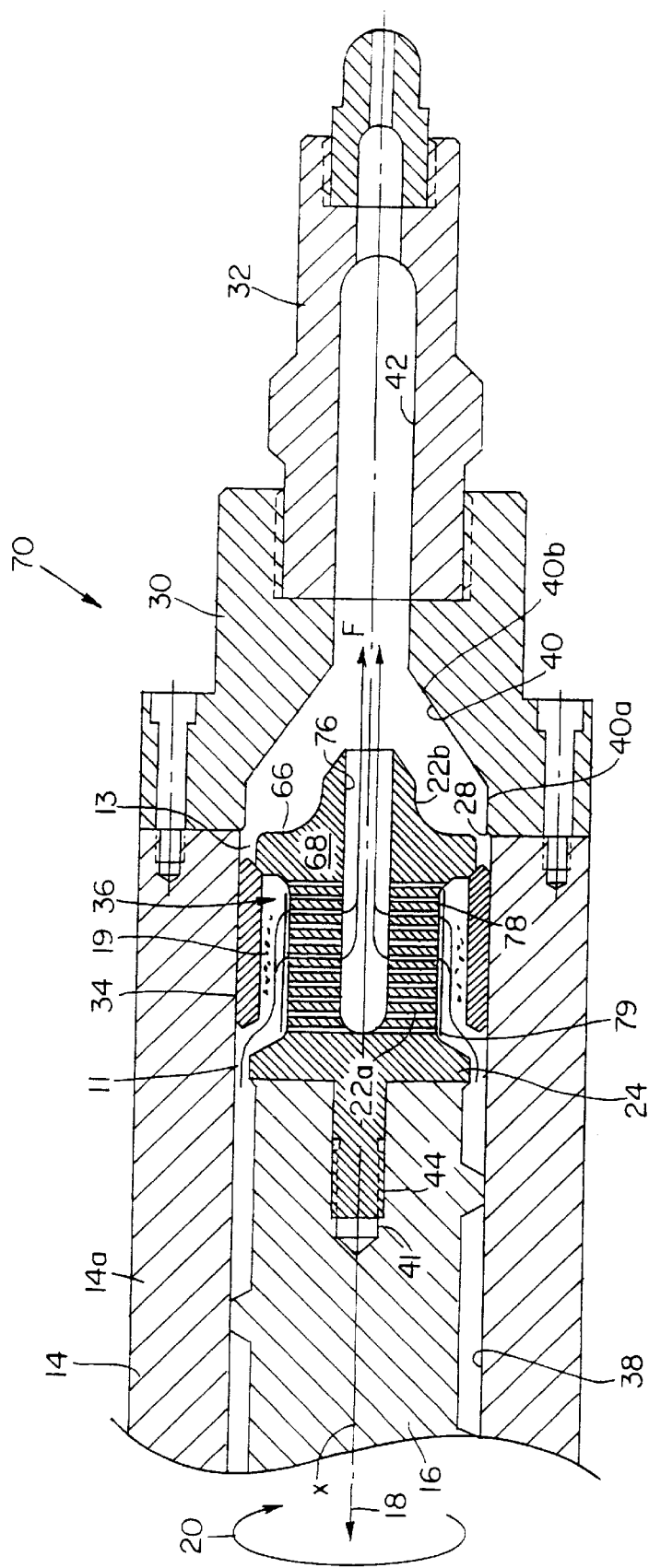
FIG. 9 is a side sectional view of the distal end of an injection molding machine including yet another preferred polymer filtration apparatus.
Figure 10:
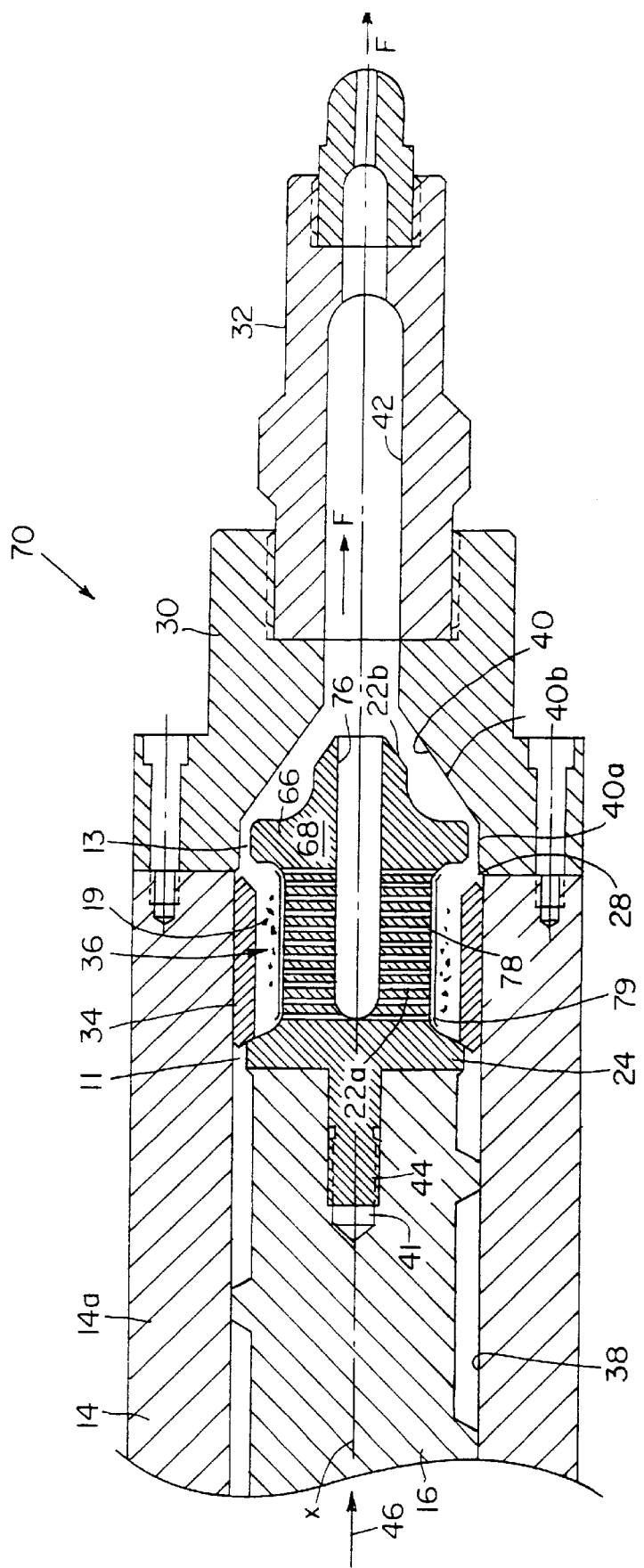
FIG. 10 is a side sectional view of the injection molding machine and filtration apparatus of FIG. 9 with the screw translated forward in a polymer injection stroke.
Figure 11:
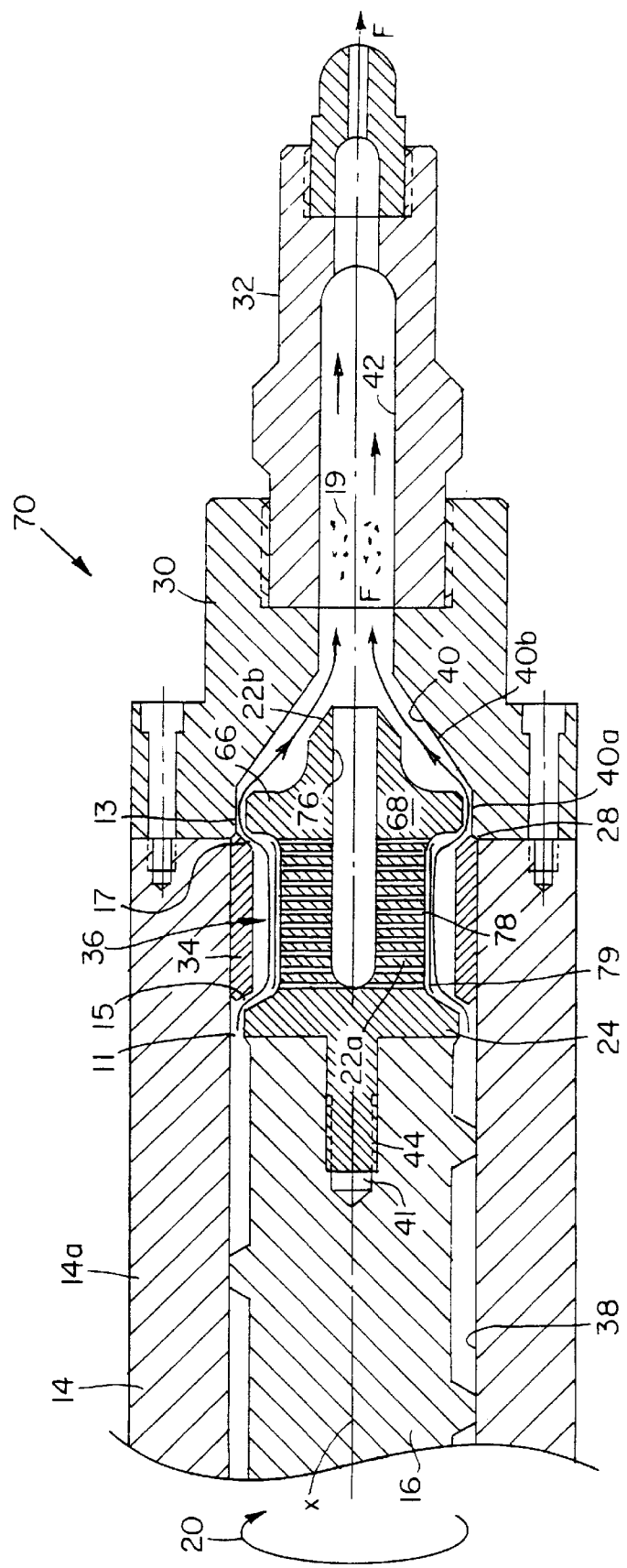
FIG. 11 is a side sectional view of the injection molding machine and filtration apparatus of FIG. 9 with the screw positioned forward for purging contaminants from the filter.

Referring to FIGS. 9, 10 and 11, filtration apparatus 70 differs from filtration apparatus 10 in that tip member 68 has a solid downstream flange 66 and a central bore 76 extending outwardly through tip 22b. A series of filter holes 78 extend radially inwardly into intermediate shaft portion 22a to central bore 76.

In the operation of filtration apparatus 70 (FIG. 9), when screw 16 is rotated in the direction of arrow 20 to plasticize polymer pellets within bore 38 and translated backwardly in the direction of arrow 18 to accumulate molten polymer within bore 38, the flow of molten polymer forces ring member 34 against downstream flange 66. This seals annular gap 13 and directs the molten polymer through filter holes 78 for removing contaminants 19. The contaminants 19 accumulate within annular region 36 behind downstream flange 66 and filter holes 78. The flow path of the molten polymer as indicated by arrows F, axially passes upstream flange 24 through annular gap 11 and flows radially inwardly into annular region 36. The polymer then flows radially inwardly through filter holes 78 and axially out through bore 76.

Referring to FIG. 10, when screw 16 is translated in the forward injection stroke for injecting a shot of molten polymer from bore 38 into a mold, as indicated by arrows F, ring member 34 is forced against upstream flange 24, thereby sealing annular gap 11 and preventing the backflow of molten polymer past flange 24.

Referring to FIG. 11, when the purging of contaminants 19 from annular region 36 is necessary, screw 16 is translated forward to position downstream flange 66 within constant diameter portion 40a and past shoulder 28 in a similar manner as shown in FIG. 4. This positions ring member 34 midway between flanges 24 and 66. As a result, molten polymer flows around tip member 68 to purge contaminants 19 captured within annular region 36 behind downstream flange 66 and filter holes 78 for discharge through nozzle 32. The flow path of the molten polymer as indicated by arrows F, axially passes upstream flange 24 through gap 11 and flows radially inwardly into annular region 36 through gap 15. The molten polymer flows axially through annular region 36 and then radially outwardly through gap 17 to flow axially past downstream flange 66 through gap 13. The polymer then flows over tip 22b, through bore 40, and out through nozzle opening 42 of nozzle 32.

A tubular filter screen 79 can be optionally included for removing contaminants 19. Filter screen 79 is installed by separating intermediate shaft portion 22a from upstream flange 24 and slipping filter screen 79 over intermediate shaft portion 22a. Intermediate shaft portion 22a is then resecured to upstream flange 24. Filter screen 79 preferably has a pore size of 10 microns to 1000 microns with 100 microns being the most preferred. If a filter screen 79 is employed, filter holes 78 within intermediate shaft portion 22a can be enlarged to preferably about 5,000 microns. Alternatively, depending upon the application at hand, filter holes 78 can range between 2,000 microns and 10,000 microns when a filter screen 79 is used.

Referring to FIGS. 12, 13, 14 and 15, filtration apparatus 90 differs from filtration apparatus 50 in that tip member 82 includes an upstream flange 84 having a shoulder 98 and a downstream flange 86 with a series of large axial openings 86a therethrough. In addition, ring member 88 has an upstream wall 92 and a downstream wall 94 with a series of respective axial openings 92a and 94a therethrough.

In the operation of filtration apparatus 90 (FIGS. 12 and 13), when screw 16 is rotated in the direction of arrow 20 to plasticize polymer pellets within bore 38 and translated backwardly in the direction of arrow 18 to accumulate molten polymer within bore 38, the flow of molten polymer forces ring member 88 against downstream flange 86. This seals annular gap 13 as well as blocks the openings 94a in the downstream wall 94 of ring member 88. The flow path of the molten polymer as indicated by arrows F, is directed axially past upstream flange 84 through annular gap 11 and axially into annular region 62 through openings 92a in the upstream wall 92 of ring member 88. The polymer then flows radially inwardly through the filter holes 54a of radial wall 54 into annular region 36, axially through the openings 86a in downstream flange 86 and over tip 22b. Contaminants 19 are trapped behind filter holes 54a within annular region 62.

Figure 14:
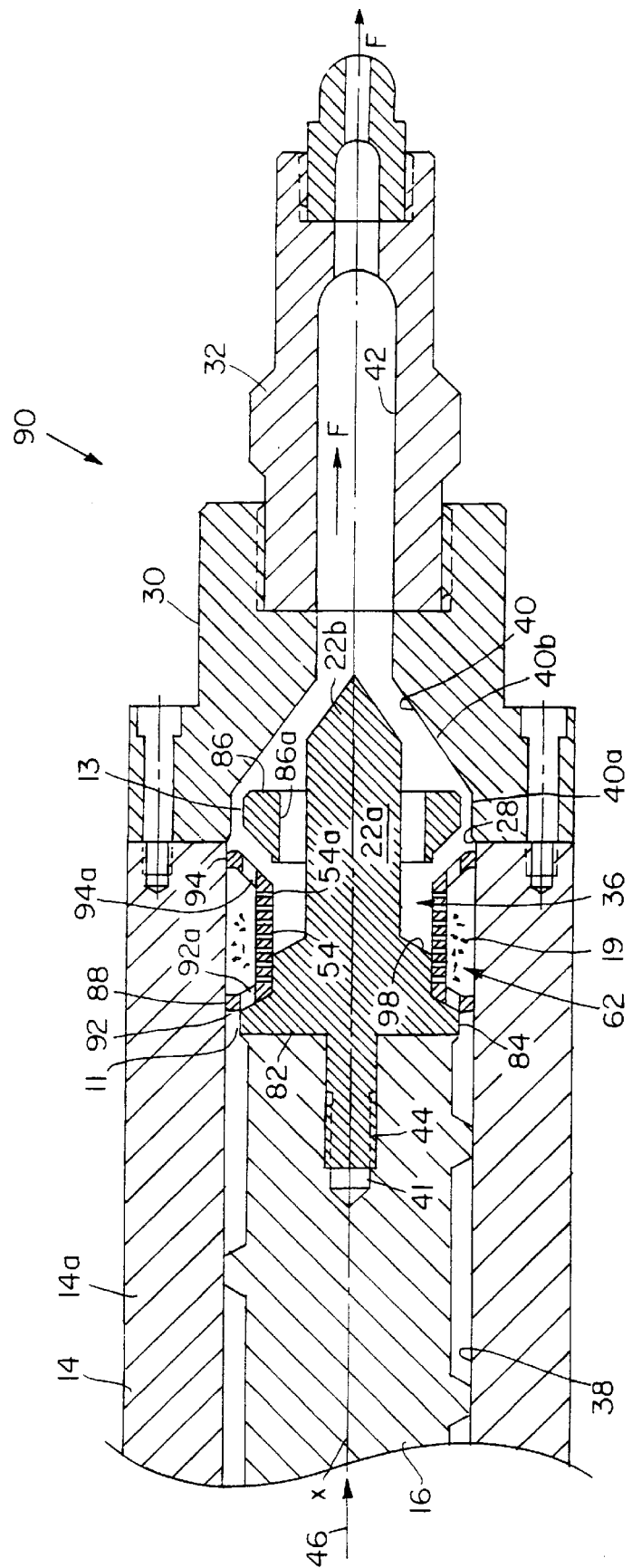
FIG. 14 is a side sectional view of the injection molding machine and filtration apparatus of FIG. 12 with the screw translated forward in a polymer injection stroke.

Referring to FIG. 14, when screw 16 is translated in the forward injection stroke for injecting a shot of molten polymer from bore 38 into a mold, as indicated by arrows F, the upstream wall 92 of ring member 88 is forced against upstream flange 84 and radial wall 54 is seated on shoulder 98. This seals gap 11 and the series of openings 92a within upstream wall 92 which prevents the backflow of molten polymer past upstream flange 84.

Figure 15:
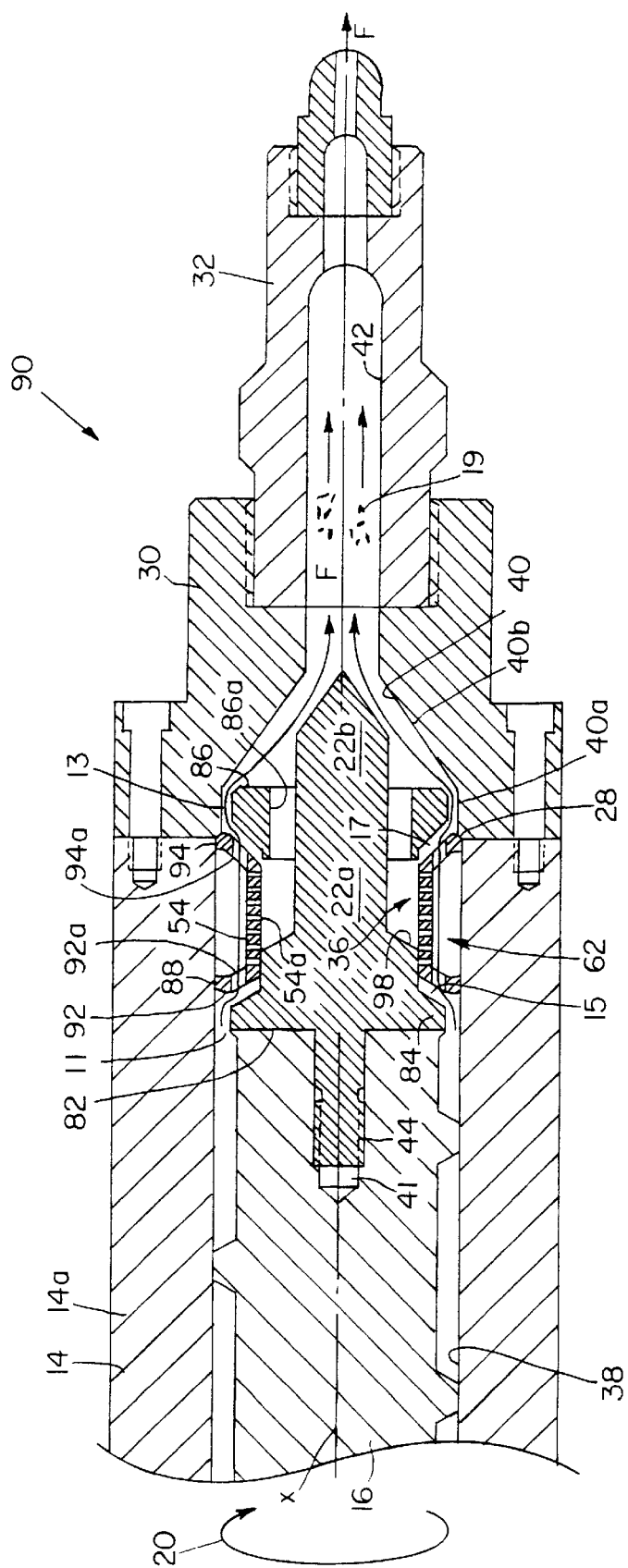
FIG. 15 is a side sectional view of the injection molding machine and filtration apparatus of FIG. 12 with the screw positioned forward for purging contaminants from the filter.

Referring to FIG. 15, when the purging of contaminants 19 from annular region 62 is necessary, screw 16 is translated forward to position ring member 88 midway between flanges 84 and 86 in the same manner previously described and then rotated. As a result, molten polymer flows around tip member 82 and axially through the annular region 62 of ring member 88 to purge and discharge contaminants 19 trapped behind filter holes 54a through nozzle 32. The flow path of the molten polymer, as indicated by arrows F, flows axially past upstream flange 84 through gap 11, radially inwardly through gap 15, axially through openings 92a in upstream wall 92 of ring member 88, axially through annular region 62, axially through openings 94a in downstream wall 94 of ring member 88, radially outwardly through gap 17, axially past downstream flange 86 through gap 13, over tip 22b, through bore 40, and out through the nozzle opening 42 of nozzle 32.

Equivalents

While this invention has been particularly shown and described with references to preferred embodiments thereof, it will be understood by those skilled in the art that various changes in form and details may be made therein without departing from the spirit and scope of the invention as defined by the appended claims. For example, features depicted in filtration apparatuses 10, 50, 70 and 90, can be interchanged. In addition, filtration apparatuses 10, 50, 70 and 90 can be installed within existing injection molding machines or included within new equipment. Furthermore, although shoulder 28 of end cap 30 has been shown and described as being employed as an end stop for preventing downstream travel of the ring members, alternatively, other suitable methods of providing an end stop can be employed. For example, a shoulder can be machined within bore 38, a sleeve can be fitted within bore 38, or small protrusions can be formed or installed within bore 38. Also, although the ring members are preferably positioned midway between the flanges of the tip members during purging, during actual use, the ring members may sometimes be slightly closer to one of the flanges. Finally, although only filtration apparatus 70 has been shown with a filter screen 79, a filter screen can be employed in filtration apparatuses 10, 50 and 90 if desired.

What is claimed is:

1. A filtration apparatus for an injection molding machine, the injection molding machine including a screw housed within a bore for generating molten polymer, the filtration apparatus comprising:

a tip member extending axially from the screw, the tip member having radially extending upstream and downstream flanges positioned axially apart from each other;

a filter encircling the tip member capable of filtering the molten polymer;

an annular ring member encircling the tip member and slidably positioned within the bore between the upstream and downstream flanges, the ring member capable of slidably engaging the downstream flange for directing the molten polymer through the filter as well as slidably engaging the upstream flange for preventing back flow of the molten polymer past the upstream flange; and an end stop positioned relative to the bore capable of engaging and preventing movement of the ring member past the end stop while allowing the downstream flange of the tip member to be translated forwardly therepast to simultaneously space the upstream and downstream flanges apart from the ring member for directing the molten polymer past upstream surfaces of the filter for purging contaminants filtered from the molten polymer.

2. The filtration apparatus of claim 1 in which the end stop comprises an annular shoulder.

3. The filtration apparatus of claim 2 further comprising an end cap having an annular surface forming the shoulder.

4. The filtration apparatus of claim 1 in which the filter comprises a series of holes extending within a peripheral region of the tip member around the tip member.

5. The filtration apparatus of claim 4 in which the holes extend radially inwardly into the tip member to a central bore in an area between the flanges.

6. The filtration apparatus of claim 4 in which the holes axially extend through the downstream flange.

7. The filtration apparatus of claim 1 in which the tip member is mounted to the screw.

8. The filtration apparatus of claim 1 in which the ring member includes an inner radial wall and opposing upstream and downstream walls substantially enclosing an annular region.

9. The filtration apparatus of claim 8 in which the filter comprises a series of holes extending through the radial wall of the ring member.

10. The filtration apparatus of claim 9 in which the downstream wall of the ring member includes axial openings for allowing the molten polymer to pass from the annular region through the downstream wall.

11. The filtration apparatus of claim 1 in which the filter comprises a screen.

12. A filtration apparatus for an injection molding machine, the injection molding machine including a screw housed within a bore for generating molten polymer, the filtration apparatus comprising:

a tip member extending axially from the screw, the tip member having radially extending upstream and downstream flanges positioned axially apart from each other;

a filter encircling the tip member capable of filtering the molten polymer;

an annular ring member encircling the tip member and slidably positioned within the bore between the upstream and downstream flanges, the ring member capable of slidably engaging the downstream flange for directing the molten polymer through the filter as well as slidably engaging the upstream flange for preventing back flow of the molten polymer past the upstream flange; and an end cap having a shoulder for mounting to the bore, the shoulder capable of engaging and preventing movement of the ring member past the shoulder while allowing the downstream flange of the tip member to be translated forwardly therepast to simultaneously space the upstream and downstream flanges apart from the ring member for directing the molten polymer past upstream surfaces of the filter for purging contaminants filtered from the molten polymer.

13. The filtration apparatus of claim 12 in which the filter comprises a series of holes extending within a peripheral region of the tip member around the tip member.

14. The filtration apparatus of claim 13 in which the holes extend radially inwardly into the tip member to a central bore in an area between the flanges.

15. The filtration apparatus of claim 13 in which the holes axially extend through the downstream flange.

16. The filtration apparatus of claim 12 in which the ring member includes an inner radial wall and opposing upstream and downstream walls substantially enclosing an annular region, a series of holes extending through the radial wall of the ring member to form the filter, and axial openings extending through the downstream wall for allowing the molten polymer to pass from the annular region through the downstream wall.

17. An injection molding machine comprising:

a bore;

a screw within the bore for plasticizing polymer, the screw being translatable between forward and rearward positions to allow polymer melt to flow and accumulate forward of the screw, and to allow injection of the melt with a forward stroke of the screw;

a filter for filtering polymer melt as the melt flows forward of the screw; and a normally closed bypass path for directing polymer melt past the filter, the bypass path being opened during a contaminant purge by forward flow of polymer melt while the screw is in a forward position in which polymer melt is delivered by the screw past the filter and out of the bore.

18. The machine of claim 17 further comprising a screw tip having a forward flange;

an axially translatable ring positioned about the screw tip for controlling the bypass path, the ring being moved forward against the forward flange by forward flow of polymer melt during normal operation to close the bypass path; and a restraint for restraining the ring from abutting the forward flange to open the bypass path when the screw is moved in the forward position while the screw causes polymer melt to flow forward.

19. The machine of claim 18 in which the restraint is a shoulder in the bore.

20. The machine of claim 18 in which the screw tip further includes a rearward flange wherein, during an injection stroke, the ring abuts a rearward flange to prevent backflow along the screw.

21. A method of forming a filtration apparatus for an injection molding machine, the injection molding machine including a screw housed within a bore for generating molten polymer, the method comprising the steps of:

axially extending a tip member from the screw, the tip member having radially extending upstream and downstream flanges positioned axially apart from each other;

encircling a filter around the tip member capable of filtering the molten polymer;

slidably positioning an annular ring member within the bore and encircling the tip member between the upstream and downstream flanges, the ring member capable of slidably engaging the downstream flange for directing the molten polymer through the filter as well as slidably engaging the upstream flange for preventing back flow of the molten polymer past the upstream flange; and positioning an end stop relative to the bore capable of engaging and preventing movement of the ring member past the end stop while allowing the downstream flange of the tip member to be translated forwardly therepast to simultaneously space the upstream and downstream flanges apart from the ring member for directing the molten polymer past the upstream and downstream flanges as well as past upstream surfaces of the filter for purging contaminants filtered from the molten polymer.

22. The method of claim 21 further comprising the step of forming the end stop from an annular shoulder.

23. The method of claim 22 further comprising the step of forming the shoulder from an annular surface of an end cap.

24. The method of claim 21 further comprising the step of forming the filter by forming a series of holes extending within a peripheral region of the tip member around the tip member.

25. The method of claim 24 further comprising the step of extending the holes radially inwardly into the tip member to a central bore in an area between the flanges.

26. The method of claim 24 further comprising the step of axially extending the holes through the downstream flange.

27. The method of claim 21 further comprising the step of mounting the tip member to the screw.

28. The method of claim 21 further comprising the step of forming the ring member with an inner radial wall and opposing upstream and downstream walls, the walls substantially enclosing an annular region.

29. The method of claim 28 further comprising the step of forming the filter by extending a series of holes through the radial wall.

30. The method of claim 21 further comprising the step of forming axial openings in the downstream wall of the ring member for allowing the molten polymer to pass from the annular region through the downstream wall.

31. The method of claim 21 further comprising the step of forming the filter from a screen.

32. A method of purging contaminants filtered from molten polymer by a filtration apparatus within a bore of an injection molding machine, the filtration apparatus including a tip member including radially extending upstream and downstream flanges positioned axially apart from each other, a filter encircling the tip member for filtering the molten polymer, and an annular ring member slidably positioned within the bore and encircling the tip member between the upstream and downstream flanges, the ring member capable of slidably engaging the downstream flange for directing the molten polymer through the filter as well as slidably engaging the upstream flange for preventing back flow of the molten polymer past the upstream flange, the method comprising the steps of:

positioning an end stop relative to the bore to engage and prevent movement of the ring member past the end stop; and translating the downstream flange of the tip member past the end stop to simultaneously space the upstream and downstream flanges apart from the ring member for directing the molten polymer past upstream surfaces of the filter for purging the contaminants filtered from the molten polymer.

33. A method of forming an injection molding machine comprising:

providing a bore;

positioning a screw within the bore for plasticizing polymer into polymer melt, the screw being translatable between forward and rearward positions to allow polymer melt to flow and accumulate forward of the screw, and to allow injection of the melt with a forward stroke of the screw;

positioning a filter within the bore for filtering polymer melt as the melt flows forward of the screw; and providing a normally closed bypass path for directing polymer melt past the filter, the bypass path being opened during a contaminant purge by forward flow of polymer melt while the screw is in a forward position in which the polymer melt is delivered by the screw past the filter and out of the bore.

\* \* \* \* \*